(12) United States Patent
Miwa

(10) Patent No.: US 10,635,888 B2
(45) Date of Patent: Apr. 28, 2020

(54) SMART-SECURITY DIGITAL SYSTEM, METHOD AND PROGRAM

(71) Applicant: TECHNOMIRAI CO., LTD., Tokyo (JP)

(72) Inventor: Kazuo Miwa, Tokyo (JP)

(73) Assignee: TECHNOMIRAI CO., LTD., Tokyo (JP)

( * ) Notice: Subject to any disclaimer, the term of this patent is extended or adjusted under 35 U.S.C. 154(b) by 98 days.

(21) Appl. No.: 15/753,487

(22) PCT Filed: Aug. 19, 2015

(86) PCT No.: PCT/JP2015/073208
§ 371 (c)(1),
(2) Date: Feb. 19, 2018

(87) PCT Pub. No.: WO2017/029718
PCT Pub. Date: Feb. 23, 2017

(65) Prior Publication Data
US 2018/0239953 A1    Aug. 23, 2018

(51) Int. Cl.
*G06K 9/00* (2006.01)
*H04N 7/18* (2006.01)
(Continued)

(52) U.S. Cl.
CPC ..... *G06K 9/00228* (2013.01); *G06K 9/00771* (2013.01); *G08B 13/19684* (2013.01);
(Continued)

(58) Field of Classification Search
CPC ........... G06K 9/00228; G06K 9/00771; G06K 9/00288; G06K 9/00295;
(Continued)

(56) References Cited

U.S. PATENT DOCUMENTS

| 2013/0272584 A1* | 10/2013 | Kono | G07F 17/3206 |
| | | | 382/118 |
| 2014/0368601 A1* | 12/2014 | deCharms | H04W 4/021 |
| | | | 348/14.02 |
| 2015/0341599 A1* | 11/2015 | Carey | H04N 7/181 |
| | | | 348/150 |

FOREIGN PATENT DOCUMENTS

| JP | 2008-257487 A | 10/2008 |
| JP | 2011-233133 A | 11/2011 |

OTHER PUBLICATIONS

International Search Report issued in Application No. PCT/JP2015/073208, dated Nov. 17, 2015.

\* cited by examiner

*Primary Examiner* — Kenny A Cese
(74) *Attorney, Agent, or Firm* — Michael Best & Friedrich LLP

(57) ABSTRACT

Provided is a smart-security digital system that enables, when there is a habitual shoplifter or suspicious behavior person, an employee or the like close to the habitual shoplifter or suspicious behavior person to quickly rush to the scene and prevent an act of shoplifting. The smart-security digital system (1000) comprises a face authentication function unit (111) that collates with facial images of habitual shoplifters or suspicious behavior persons accumulated in a face information DB (160), a control unit (110) that determines, when a result of collation by the face authentication function unit (111) is a match, a position of a mobile terminal device (30) closest to the habitual shoplifter or suspicious behavior person the collation result with whom is a match based on positional information acquired from a position determination unit (113), and transmits information on the habitual shoplifter or suspicious behavior person to the mobile terminal device (30), and an image processing unit
(Continued)

(170) that synthesizes videos shot by monitor cameras (11) into a display screen consisting of a plurality of split screens, and performs a zoom-in processing to zoom in one of the split screens.

6 Claims, 10 Drawing Sheets

(51) Int. Cl.
*G08B 25/04* (2006.01)
*G08B 13/196* (2006.01)

(52) U.S. Cl.
CPC ....... *G08B 13/19689* (2013.01); *G08B 25/04* (2013.01); *H04N 7/18* (2013.01); *H04N 7/181* (2013.01)

(58) Field of Classification Search
CPC ..... G06K 2009/00328; G06K 9/00268; G06K 9/00335; G06K 9/00362; G06K 9/00664; G08B 13/19684; G08B 13/19689; G08B 25/04; H04N 7/18; H04N 7/181; G06T 2207/30232; G06T 2207/10016; G06T 7/292; G06T 2207/30196; G06T 7/20
See application file for complete search history.

16-SPLIT SCREEN

|   | 1 | 2 | 3 | 4 |
|---|---|---|---|---|
| 1 | 1 × 1 | 1 × 2 | 1 × 3 | 1 × 4 |
| 2 | 2 × 1 | 2 × 2 | 2 × 3 | 2 × 4 |
| 3 | 3 × 1 | 3 × 2 | 3 × 3 | 3 × 4 |
| 4 | 4 × 1 | 4 × 2 | 4 × 3 | 4 × 4 |

~50

ZOOMED-IN SCREEN

~50

● HABITUAL SHOPLIFTERS
G1 TO G4
SUSPICIOUS BEHAVIOR
PERSONS G5 TO G7

SMART-SECURITY DIGITAL SYSTEM, METHOD AND PROGRAM

TECHNICAL FIELD

The present invention relates to a smart-security digital system, method and program to prevent shoplifting of a habitual shoplifter or the like by monitoring videos shot by monitor cameras.

BACKGROUND ART

The retail industry has spent huge amounts of money on measures against shoplifting. Shoplifting causes not only a direct loss of profits but also, due to a shortage of supply and stockout, a loss of sales opportunity leading to huge operating losses. As defense measures, patrol and surveillance by security guards, monitoring by security cameras, and monitoring by face authentication cameras, etc., are performed.

Patent Literature 1 describes a shoplifting prevention system at a gate of which a monitor camera is provided and which acquires face information from a received image, refers to face information saved in a storage device, and displays a screen showing the position of shooting in the store if a person corresponding to the face information has been shot.

Patent Literature 2 describes a face authentication applied shoplifting detection system which notifies shop staff of an approach of a habitual shoplifter by an alarm.

CITATION LIST

Patent Literature

[Patent Literature 1] JP 2011-233133 A
[Patent Literature 2] JP 2008-257487 A

SUMMARY OF INVENTION

Technical Problem

However, in these conventional shoplifting prevention systems, as a method of notifying an employee near a habitual shoplifter, an alarm, an interphone, or a wireless mobile device is used, however, in a case where an employee cannot know who is near him/her, an employee near the shoplifter is not aware of the notification due to noise or the like of a sales floor, or cannot respond to the notification because of stocking shelves or physiological reasons, a security guard must rush by the notification, however, in this case, such a rushing is insufficient since the habitual shoplifter may have already completed an act of shoplifting, moved to another sales floor, or left the store. In particular, in large-scaled malls and home centers, etc., rushing from a security guards room and an office room, etc., is difficult.

In order to prevent an act of shoplifting, when there is a habitual shoplifter or a suspicious person, a sales floor responsible person, an employee, or a security guard near the habitual shoplifter or suspicious person must rush to him/her in real time and prevent the act.

An object of the present invention is to provide a smart-security digital system, method and program that enables an employee or the like near a person with criminal behavior, a person being a habitual shoplifter, or a suspicious behavior person, to rush to the scene in real time and prevent an act of shoplifting, etc., when the person is present in a commercial facility, a hotel, an office, a multipurpose complex building, a meeting place, a hospital, a bank, a theater, a college, a factory, an apartment building, a terminal building, an underground mall, a laboratory, or the like.

Solution to Problem

A smart-security digital system according to the present invention prevents shoplifting of a habitual shoplifter or the like by monitoring videos shot by monitor cameras installed to shoot a predetermined monitoring target area in a store, comprising: a positional information acquiring means that acquires positional information of mobile terminal devices that a plurality of employees respectively carry with them in the store; a facial image storing means that accumulates facial images of habitual shoplifters or suspicious behavior persons; a face authentication collating means that collates a facial image of a person shot by the monitor camera with the facial images of habitual shoplifters or suspicious behavior persons accumulated in the facial image storing means; a control means that determines, when a result of collation by the face authentication collating means is a match, a position of the mobile terminal device closest to the habitual shoplifter or suspicious behavior person the collation result with whom is a match based on positional information acquired from the positional information acquiring means, and transmits information on the habitual shoplifter or suspicious behavior person to the mobile terminal device; a monitor device that synthesizes videos shot by the monitor cameras into a display screen consisting of a plurality of split screens, and performs a zoom-in processing to zoom in one of the split screens; and the mobile terminal devices each of which includes a response-inability setting unit that presets not being able to answer back to information transmitted from the monitor device, and when response inability has been set by said response-inability setting unit, returns an answer-back of said response inability to information transmitted from the monitor device, wherein the control means determines, when an answer-back of response inability is returned from the mobile terminal device, a position of the mobile terminal device next closest to the habitual shoplifter or suspicious behavior person the collation result with whom is a match, transmits information on the habitual shoplifter or suspicious behavior person to said mobile terminal device, and on the display screen of said mobile terminal device, zooms in a screen displaying a video of the habitual shoplifter or suspicious behavior person shot by the monitor camera.

When an answer-back of response inability is returned from the mobile terminal device, the control means determines a position of the mobile terminal device next closest to the habitual shoplifter or suspicious behavior person the collation result with whom is a match, and transmits information on the habitual shoplifter or suspicious behavior person to said mobile terminal device, and accordingly, even if an employee carrying a mobile terminal device closest to the habitual shoplifter or suspicious behavior person is unable to respond thereto because of stocking shelves or physiological reasons, an employee carrying a mobile terminal device next closest to the habitual shoplifter or suspicious behavior person can promptly respond thereto. Employees may go to a warehouse or go to the bathroom, and thus do not always stay in fixed positions, and therefore, a case is considered in which reporting to an employee to whom a report is to be made is not feasible. Such a situation can be dealt with.

When a predetermined time elapses from transmission of the information on the habitual shoplifter or suspicious behavior person to the mobile terminal device, the control means determines a position of the mobile terminal device next closest to the habitual shoplifter or suspicious behavior person the collation result with whom is a match, and transmits information on the habitual shoplifter or suspicious behavior person to said mobile terminal device, and accordingly, even if an employee carrying a mobile terminal device closest to the habitual shoplifter or suspicious behavior person is not aware thereof because of noise or the like of a sales floor, an employee carrying a mobile terminal device next closest to the habitual shoplifter or suspicious behavior person can promptly respond thereto.

The information on the habitual shoplifter or suspicious behavior person includes information of a position of the habitual shoplifter or suspicious behavior person and a position of the mobile terminal device to which said information was transmitted, overlapped on the monitoring target area, and accordingly, an employee who received said information can promptly recognize the position of the habitual shoplifter or the like on the scene.

The information on the habitual shoplifter or suspicious behavior person includes a facial image of the habitual shoplifter or suspicious behavior person present in the monitoring target area, and accordingly, an employee who received said information can promptly identify the habitual shoplifter or the like on the scene by looking at his/her face.

The control means tracks movement of the habitual shoplifter or suspicious behavior person in the monitoring target area, and when the habitual shoplifter or suspicious behavior person distances himself/herself from the position of the closest mobile terminal device by a predetermined distance, transmits information on the habitual shoplifter or suspicious behavior person to another one of the mobile terminal devices, and accordingly, even if the habitual shoplifter or the like moves in the store, a plurality of employees can respond thereto in liaison with each other.

By acquiring positional information of employees in the monitoring target area by authentication of authentication tags that the employees carry with them by a plurality of RFID readers installed in the monitoring target area, or positional information from GPS function units that the mobile terminal devices comprise, the positional information acquiring means can acquire positional information of the employees by a simple configuration.

A smart-security digital method according to the present invention prevents shoplifting of a habitual shoplifter or the like by monitoring videos shot by monitor cameras installed to shoot a predetermined monitoring target area in a store, wherein a monitor device performs: a positional information acquiring step of acquiring positional information of mobile terminal devices that a plurality of employees respectively carry with them in the store; a facial image storing step of accumulating facial images of habitual shoplifters or suspicious behavior persons; a face authentication collating step of collating a facial image of a person shot by the monitor camera with the facial images of habitual shoplifters or suspicious behavior persons accumulated in the facial image storing step; a control step of determining, when a result of collation by the face authentication collating step is a match, a position of the mobile terminal device closest to the habitual shoplifter or suspicious behavior person the collation result with whom is a match based on positional information acquired in the positional information acquiring step, and transmitting information on the habitual shoplifter or suspicious behavior person to said mobile terminal device; and an image processing step of synthesizing videos shot by the monitor cameras on a display screen consisting of a plurality of split screens, and performing a zoom-in processing to zoom in one of the split screens, and the mobile terminal device performs: a response-inability setting step of presetting being unable to answer back to information transmitted from the monitor device; and a response inability answering step of returning, when response inability has been set through the response-inability setting step, an answer-back of said response inability to information transmitted from the monitor device, wherein the control step is determining, when an answer-back of response inability is returned from the mobile terminal device, a position of the mobile terminal device next closest to the habitual shoplifter or suspicious behavior person the collation result with whom is a match, transmitting information on the habitual shoplifter or suspicious behavior person to said mobile terminal device, and on the display screen of said mobile terminal device, zooming in a screen displaying a video of the habitual shoplifter or suspicious behavior person shot by the monitor camera.

In addition, the present invention provides a program to make a computer function as a smart-security digital system that prevents shoplifting of a habitual shoplifter or the like by monitoring videos shot by monitor cameras installed to shoot a predetermined monitoring target area in a store, and comprises a positional information acquiring means that acquires positional information of mobile terminal devices that a plurality of employees respectively carry with them in the store, a facial image storing means that accumulates facial images of habitual shoplifters or suspicious behavior persons, a face authentication collating means that collates a facial image of a person shot by the monitor camera with the facial images of habitual shoplifters or suspicious behavior persons accumulated in the facial image storing means, a control means that determines, when a result of collation by the face authentication collating means is a match, a position of the mobile terminal device closest to the habitual shoplifter or suspicious behavior person the collation result with whom is a match based on positional information acquired from the positional information acquiring means, and transmits information on the habitual shoplifter or suspicious behavior person to the mobile terminal device, a monitor device that synthesizes videos shot by the monitor cameras into a display screen consisting of a plurality of split screens, and performs a zoom-in processing to zoom in one of the split screens, and the mobile terminal devices each of which includes a response-inability setting unit that presets not being able to answer back to information transmitted from the monitor device, and when response inability has been set by said response-inability setting unit, returns an answer-back of said response inability to information transmitted from the monitor device, wherein the control means determines, when an answer-back of response inability is returned from the mobile terminal device, a position of the mobile terminal device next closest to the habitual shoplifter or suspicious behavior person the collation result with whom is a match, transmits information on the habitual shoplifter or suspicious behavior person to said mobile terminal device, and on the display screen of said mobile terminal device, zooms in a screen displaying a video of the habitual shoplifter or suspicious behavior person shot by the monitor camera.

Advantageous Effects of Invention

According to the present invention, when there is a habitual shoplifter or suspicious behavior person, an employee or the like closest to the habitual shoplifter or the like can promptly rush to the scene and prevent an act of shoplifting or the like.

DESCRIPTION OF EMBODIMENTS

Hereinafter, modes for carrying out the present invention will be described in detail with reference to the accompanying drawings.

Embodiment

Figure 1:
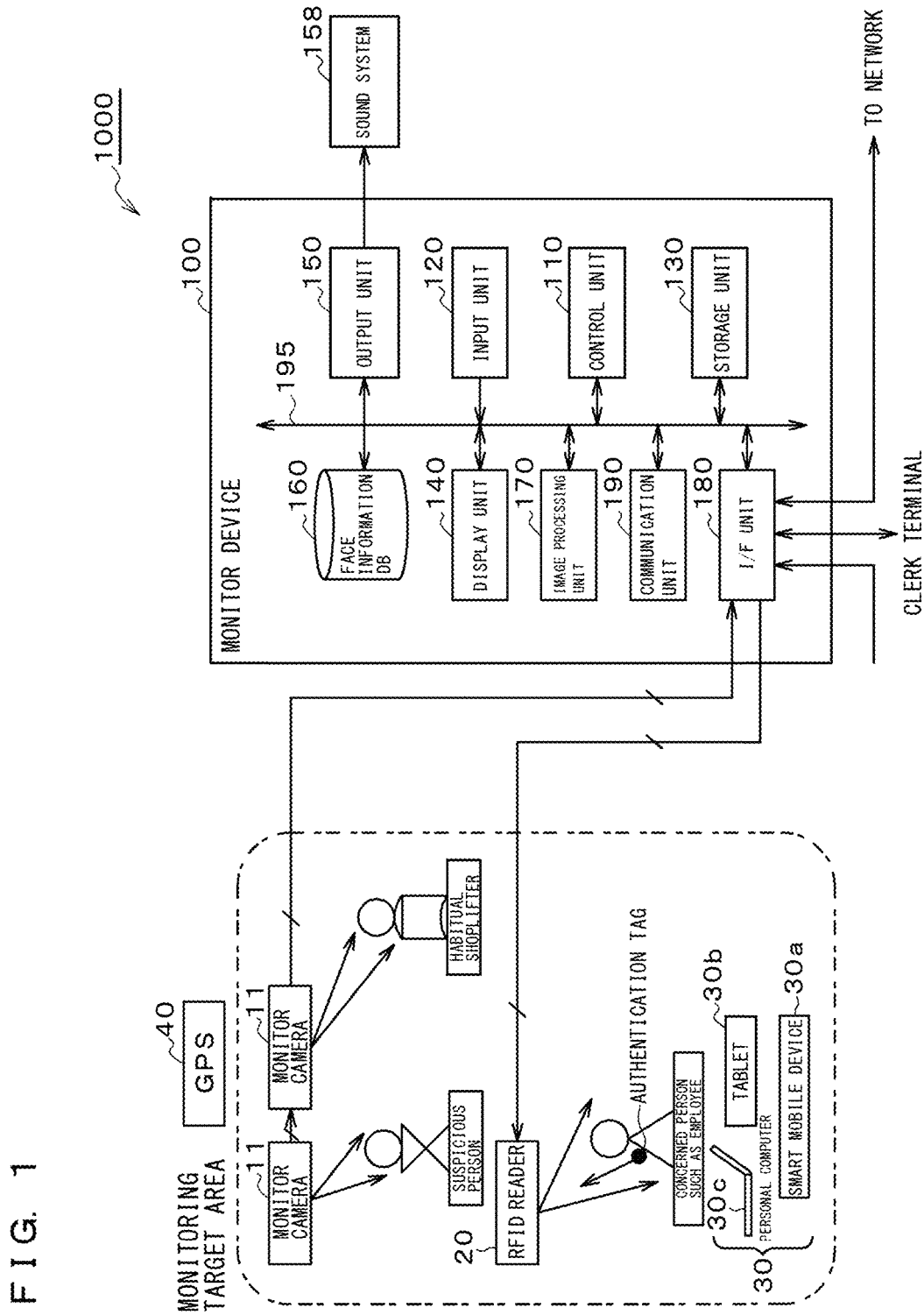
FIG. 1 is a block diagram showing a configuration of a smart-security digital system according to an embodiment of the present invention.

FIG. 1 is a block diagram showing a configuration of a smart-security digital system according to an embodiment of the present invention.

As shown in FIG. 1, a smart-security digital system 1000 comprises a plurality of monitor cameras 11 installed on a ceiling, etc., of a monitoring target area, RFID (Radio Frequency IDentification) readers 20 installed on store shelves, etc., in the monitoring target area, authentication tags 21 that concerned persons such as employees (hereinafter, referred to as employees) carry with them and are authenticated by the RFID readers 20, a GPS (Global Positioning System) 40 that captures positions of employees in the monitoring target area, and a monitor device 100 that controls the whole system.

The smart-security digital system 1000 monitors videos from the monitor cameras 11 installed in the monitoring target area and notifies the mobile terminal device 30 that an employee carries with him/her information on a habitual shoplifter or suspicious behavior person so that the employee prevents shoplifting of the habitual shoplifter.

<Monitor Camera 11>

A plurality of monitor cameras 11 are installed in a store or the like and can shoot videos of persons and videos of a monitoring area. There is one that makes monitor cameras 11 track a specific person or shooting location. Even if monitor cameras do not track a shooting place, by installing a plurality of monitor cameras 11, an image of a person, etc., can be shot multidirectionally.

The monitor cameras 11 are authentication cameras that shoot images of people's faces. The monitor cameras 11 are installed at respective places in a monitoring target area such as the inside of a store, and shoot images of people's faces. Images shot by the monitor cameras 11 are output to the monitor device 100. The monitor camera 11 may shoot a moving image at all times, or may shoot a single still image every certain period of time (for example, a few seconds).

<RFID Reader 20>

The RFID reader 20 manages the settlement or the like of a commodity with an RF tag by detecting whether there is an answer-back in response to a transmission to the RF tag attached to the commodity. In addition, the RF tag is removed from or disabled in an article having been brought into a state of being able to be rightfully taken out of the store by being purchased or the like.

In the present embodiment, the RFID reader 20 authenticates an authentication tag 21 that an employee possesses. By authenticating an authentication tag 21 that an employee possesses, the RFID reader 20 captures a position of the employee that carries the authentication tag 21.

<Mobile Terminal Device 30>

The mobile terminal devices 30 are respectively carried by a plurality of employees in the store. Examples of the mobile terminal devices 30 are smartphones 30*a*, tablets 30*b*, and notebook PCs 30*c*. Other examples of the mobile terminal devices 30 are mobile telephones, PHS (Personal Handy-Phone System) phones, PDAs (Personal Digital Assistants), and dedicated terminals. In the present embodiment, the mobile terminal device 30 can be used by each employee at a variety of locations (that is, current position), and can receive an e-mail message, a video including a moving image, or the like from the monitor device 100 via a telephone line (not shown).

In the present embodiment, the mobile terminal devices 30 are used as the smartphones 30a or the tablets 30b, and each individual can use the same at a variety of locations (that is, current position). One of the mobile terminal devices 30 is disposed at headquarters/a head office (not shown).

The mobile terminal device 30 may have a configuration including the GPS 40 that captures the employee's position.

Also, the mobile terminal device 30 includes a response-inability setting unit 31 (response-inability setting means) that presets not being able to answer back to information transmitted from a control unit 110 (refer to FIG. 3) of the monitor device 100 to be described later. The mobile terminal device 30, when response inability has been set by the response-inability setting unit 31, returns an answer-back of said response inability if transmission of information is received from the control unit 110 of the monitor device 100.

<GPS 40>

The GPS 40 receives radio waves of positional information from a GPS satellite or the like. The GPS 40 calculates, from information received via a GPS antenna, current positional information as three parameters of the latitude, longitude, and altitude to acquire positional information. It is also possible to acquire current positional information of the mobile terminal device 30 by performing transmission/reception of information with a mobile phone company server via a base station and a network used in place of, or in combination with the GPS 40. The acquired positional information is transmitted on a timely basis to the monitor device 100.

In addition, in the present embodiment, the example using a GPS satellite has been mentioned as a means for acquiring positional information, but it may be a system other than the GPS using a positional relationship with a base station. For example, when an Android (registered trademark) smartphone or a highly functional mobile phone with a camera is used as the mobile terminal device 30 being a mobile terminal, it is also possible to acquire current positional information of its own terminal through approach checking by performing transmission/reception of information with a mobile phone company server via a base station and mobile telephone communication network (not shown) used in place of GPS 40 or in combination therewith.

Also, positional information acquisition by Wi-Fi positioning, that is, positional information acquisition using a Wi-Fi access point and a predetermined positional information service may be used.

[Monitor Device 100]

The monitor device 100 is installed in, for example, a control room of the store, and provides centralized control for the monitoring target area in the store. The monitor device 100 may be a common server computer, a personal computer, or the like.

The monitor device 100 comprises a control unit 110 (control means), an input unit 120, a storage unit 130, a display unit 140, an output unit 150, a face information database (DB) 160 (facial image storing means), an image processing unit 170 (image processing means), an interface (I/F) unit 180, and a communication unit 190, and the respective units are connected by a bus 195.

When it has been detected that a person being a habitual shoplifter or suspicious behavior person (hereinafter, appropriately referred to as a "specific person") has showed up at the store, the monitor device 100 notifies information on this person and store information to the headquarters/head office and a security company system through a network.

In the following, when the subject is described as "the XX unit," the control unit 110 reads out respective programs from a ROM as needed and then loads the same in a RAM, and executes respective functions (described later). The respective programs may be stored in advance in the storage unit 130, or may be taken into the monitor device 100 when necessary via another storage medium or communication medium.

The control unit 110 is formed by a CPU (Central Processing Unit) or the like, and controls the monitor device 100 as a whole and executes a monitoring program to function as a smart-security digital system. A detailed configuration of the control unit 110 will be described later.

The input unit 120 is an input device for a user of the monitor device 100 to input instructions and the like to the monitor device 100, such as a keyboard, a mouse, a touch panel provided on a screen of the display unit 140, and a microphone.

The storage unit 130 stores still and/or moving images received from the monitor cameras 11 and various data, programs, etc., to be used by the control unit 110.

The display unit 140 displays images received from the monitor cameras 11, a GUI (Graphical User Interface) to operate the monitor device 100, etc., including operating conditions of the monitor device 100.

The output unit 150 is, for example, an audio interface, and outputs to a sound system 155 in the store a sound signal from the monitor device 100. The sound signal to be output from the monitor device 100 to the sound system 155 may be, for example, a sound signal input via a voice input device such as a microphone provided in the input unit 120 or a sound signal of music data stored in the storage unit 130 that is played by the control unit 110. The sound system 155 comprises an amplifier and a plurality of speakers disposed in the store, and makes an announcement in the store of a sound signal input from the monitor device 100.

The face information DB 160 accumulates facial images (face information) of habitual shoplifters, suspicious behavior persons, and store concerned persons, etc.

The image processing unit 170 performs a predetermined processing to a received image. Examples of the predetermined processing include contour extraction, image resizing, and resolution converting processing.

Also, the image processing unit 170 performs image processing such as applying a red or yellow frame to a facial image to be transmitted to the employee's mobile terminal device 30.

The image processing unit 170 synthesizes videos shot by the monitor cameras 11 into a display screen consisting of a plurality of split screens, and performs a zoom-in processing to zoom in one of the split screens.

The image processing unit 170 performs an image synthesis processing to arrange videos of persons and videos of a monitoring area shot by the plurality of monitor cameras 11 in a matrix. For example, the image processing unit 170 performs a processing to split a display screen 50 of the mobile terminal device 30 into sub-screens consisting of four each vertically and horizontally (4×4=16-split screen) and display videos shot by the monitor cameras 11 on the respective sub-screens. For example, on the 1×1 sub-screen designated by "1" vertically and "1" horizontally, a video shot by a first monitor camera 11 is disposed, on the 1×2 sub-screen designated by "1" vertically and "2" horizontally, a video shot by a second monitor camera 11 is disposed, and in this manner, screen synthesis is performed so that a video shot by a sixteenth monitor camera 11 is disposed on the 4×4 sub-screen designated by "4" vertically and "4" horizontally. In this case, the image processing unit 170 performs a resolution conversion processing to enable all sub-screens to be listed and displayed on the display screen 50 of the mobile terminal device 30.

Figures 2A, 2B:
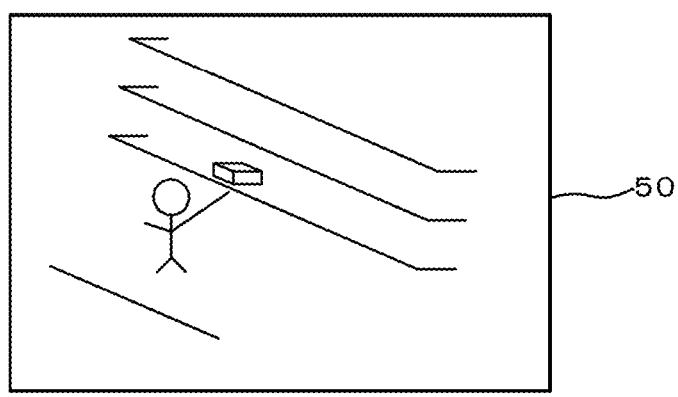
FIG. 2A is a view showing a 16-split screen in a normal situation of the smart-security digital system according to the embodiment of the present invention.
FIG. 2B is a view showing a zoomed-in screen in an abnormal situation of the smart-security digital system according to the embodiment of the present invention.

The 16-split screen shown in FIG. 2A displays a condition inside the store shot by sixteen monitor cameras 11.

The 16-split screen is shown by way of example, and the screen may be 3×4 (12-split screen) or 3×3 (9-split screen). Any arrangement example of the display screen may be adopted.

The image processing unit 170 performs a zoom-in processing to zoom in, based on a command from the control unit 110, a video on a designated sub-screen to the size of the display screen 50 of the mobile terminal device 30. This zoom-in processing is a so-called digital zoom processing to magnify an image by an image processing. Accordingly, in the "16-split screen display" (FIG. 2A), a video on a designated sub-screen is zoomed in to the size of the display screen 50 of the mobile terminal device 30. For example, as shown in FIG. 2B, a video on the 4×4 sub-screen (video shot by the sixteenth monitor camera 11) shown in FIG. 2A is zoomed in to the size of the display screen 50 of the mobile terminal device 30. The zoomed-in screen shown in FIG. 2B shows a condition on the scene shot by the sixteenth monitor camera 11 in an abnormal situation.

The I/F unit 180 connects each monitor camera 11 disposed in the monitoring target area and the monitor device 100. Also, the I/F unit 180 connects with each RFID reader 20 disposed in the monitoring target area, and sends out an authentication result of the authentication tag 21 an employee who approached the RFID reader 20 possesses to the monitor device 100. Also, the I/F unit 180 connects to the headquarters/head office, security company, and the like (not shown) by a network or dedicated line. As basic data such as persons' faces registered in the face information DB 160, data is acquired from the headquarters/head office, security company, and the like (not shown) via the I/F unit 180 to construct the face information DB 160. Also, exchanging information with the headquarters/head office, security company, and the like (not shown) can update each other's face information DBs to ones of the latest facial images (face information). In addition, the security company is not an essential structural element of the smart-security digital system according to the present embodiment.

The communication unit 190 transmits/receives data with respect to the mobile terminal device 30 via a base station. In the present embodiment, via a base station, the communication unit 190 receives positional information of the respective mobile terminal devices 30 periodically from the mobile terminal devices 30, and transmits information (an e-mail and a video including a moving image, etc.) on a habitual shoplifter or suspicious behavior person when the habitual shoplifter or suspicious behavior person is recognized.

[Control Unit 110]

Figure 3:
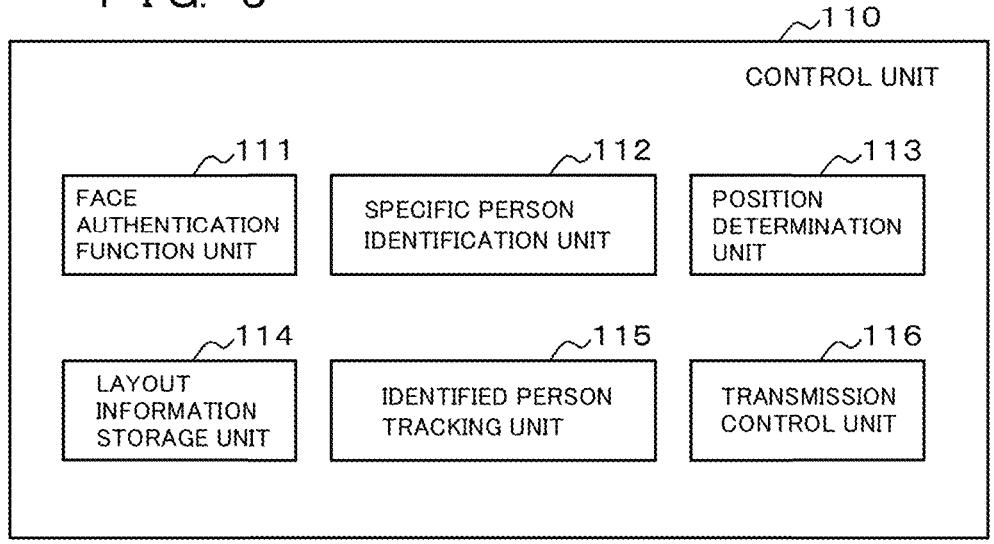
FIG. 3 is a block diagram of a control unit of a monitor device of the smart-security digital system according to the embodiment of the present invention.

FIG. 3 is a block diagram of the control unit 110 of the monitor device 100 of the smart-security digital system according to the embodiment of the present invention.

As shown in FIG. 3, the control unit 110 comprises a face authentication function unit 111 (face authentication collating means), a specific person identification unit 112 that identifies a habitual shoplifter or suspicious behavior person, a position determination unit 113 (positional information acquiring means) that determines positions of a habitual shoplifter, suspicious behavior person and employees, a layout information storage unit 114 that stores layout information of a monitoring target area, an identified person tracking unit 115 that tracks an identified person, and a transmission control unit 116 that, based on acquired positional information, transmits information regarding the habitual shoplifter or suspicious behavior person preferentially to a mobile terminal device 30 closest to the habitual shoplifter or suspicious behavior person.

When a result of collation by the face authentication function unit 111 is a match, based on positional information acquired from the position determination unit 113, the control unit 110 determines a position of a mobile terminal device 30 closest to the habitual shoplifter or suspicious behavior person the collation result with whom is a match, and transmits information on the habitual shoplifter or suspicious behavior person to said mobile terminal device 30.

If a predetermined time has elapsed from the transmission of information on the habitual shoplifter or suspicious behavior person to the mobile terminal device 30 or an answer-back of response inability is returned from the response-inability setting unit 31, the control unit 110 determines a position of a mobile terminal device 30 next closest to the habitual shoplifter or suspicious behavior person the collation result with whom is a match, and transmits information on the habitual shoplifter or suspicious behavior person to said mobile terminal device 30.

When a habitual shoplifter or suspicious behavior person is found, the control unit 110 performs zoom-in control to zoom in a screen (FIG. 2A) displaying a video of the habitual shoplifter or suspicious behavior person shot by the monitor camera 30 on only the display screen 50 of the mobile terminal device 30 that rushes to the scene in an abnormal situation. That is, when a habitual shoplifter or suspicious behavior person is found, the control unit 110 performs control so that only the display screen 50 of the mobile terminal device 30 that rushes to the scene changes from the original "16-split screen" (FIG. 2A) into a zoomed-in screen (FIG. 2B) displaying a video of the habitual shoplifter or suspicious behavior person shot by the monitor camera 30. On the video of the habitual shoplifter or suspicious behavior person shot by the monitor camera 30, a video of the monitoring area on the scene is also displayed. In detail, the control unit 110 outputs, to the image processing unit 170 (FIG. 1), a control signal to zoom in a sub-screen (FIG. 2A) displaying a video of the habitual shoplifter or suspicious behavior person shot by the monitor camera 30 to the size of the display screen 50 of the mobile terminal device 30. Based on this control signal, the image processing unit 170 performs a zoom-in processing to zoom in a sub-screen (Fig. A) displaying the video of the habitual shoplifter or suspicious behavior person shot by the monitor camera 30 to the size of the display screen 50 of the mobile terminal device 30. The control unit 110 transmits the screen displaying a zoomed-in image (one of the sub-screens in the 16-split screen) of the suspicious person or the like shot by the monitor camera 11 to the mobile terminal device 30 that rushes to the scene in an abnormal situation. To a management center (not shown in the drawing) connected to a network (FIG. 1), and to other mobile terminal devices 30, the control unit 110 transmits the same "16-split screen" (FIG. 2A) as in a normal situation.

Here, information on the habitual shoplifter or suspicious behavior person includes information in which a position of the habitual shoplifter or suspicious behavior person and positions of the employees are overlapped on a monitoring target area. In addition, the information on the habitual shoplifter or suspicious behavior person includes a facial image of the habitual shoplifter or suspicious behavior person present in the monitoring target area.

<Face Authentication Function Unit 111>

The face authentication function unit 111 performs face authentication to determine whether the face of a person included in an image received from the monitor camera 11 is any of the persons' faces registered in the face information DB 160. The face authentication can be performed based on similarity of face information extracted from a received image to the face information registered in the face information DB 160. Specifically, if the face information includes template images, similarity between the template images can be determined.

Also, the face authentication function unit 111 acquires, from face regions, information representing humans' facial characteristics (face information) to be used for face authentication, and registers the information in the face information database (DB) 160 in association with the individual images. In addition, the face authentication function unit 111 receives images of persons transmitted from headquarters (not shown), and registers the images in the face information DB 160.

In the present embodiment, the face authentication function unit 111 registers the following face information and related information.

Registration of habitual shoplifters

Recognition and cumulative storing of habitual shoplifters

Registration of suspicious behavior persons

Registration of store concerned persons, etc.

<Specific Person Identification Unit 112>

The specific person identification unit 112 collates a facial image of a person shot by the monitor camera 11 with facial images of habitual shoplifters or suspicious behavior persons accumulated in the face information DB, and identifies the person if the person has already been registered.

The specific person identification unit 112 identifies habitual shoplifters and suspicious behavior persons through the above-described face authentication processing. A suspicious behavior person is identified by, for example, the following method.

Eye contact storage authentication

Authentication by storing number of times of checking visual field of camera

Authentication by storing number of acts in time

As described above, when a person included in a received image repeatedly checks the visual field of the monitor camera 11, the person can be determined as a suspicious behavior person.

<Position Determination Unit 113>

The position determination unit 113 acquires positional information of a plurality of mobile terminal devices 30 in a monitoring target area by GPS positional information and the RFID readers 20. In detail, the position determination unit 113 acquires positional information of employees in a monitoring target area by authentication of authentication tags that the employees carry with them by a plurality of RFID readers 20 installed in the monitoring target area. In this case, the position determination unit 113 determines a position of a person identified as a habitual shoplifter or suspicious behavior person by comparing the position with installation positions of the monitor cameras 11. That is, when the employees are close to the respective RFID readers 20, by authentication of authentication tags 21 that the employees carry with them in the respective RFID readers 20, the position determination unit 113 determines that the employees are close to the corresponding RFID readers 20. Installation positions of the RFID readers 20 are registered in advance in the layout information storage unit 114, so that positions of the employees can be determined.

In addition, the position determination unit 113 acquires positional information from GPS function units that the mobile terminal devices 30 comprise.

<Layout Information Storage Unit 114>

The layout information storage unit 114 registers in advance monitoring area layout information based on the positions of the monitor cameras 11, the installation positions of the RFID readers 20, the area name, etc.

<Identified Person Tracking Unit 115>

The identified person tracking unit 115 detects a person identified to be a habitual shoplifter or suspicious behavior person by tracking with the plurality of monitor cameras 11, and checks a movement history in the monitoring target area. The identified person tracking unit 115 tracks movement of the habitual shoplifter or suspicious behavior person in the monitoring target area, and if the habitual shoplifter or suspicious behavior person distances himself/herself from the position of the closest mobile terminal device 30 by a predetermined distance, transmits information regarding the habitual shoplifter or suspicious behavior person to another mobile terminal device 30.

<Transmission Control Unit 116>

If a result of collation by the face authentication function unit 111 is a match, the transmission control unit 116 determines the position of a mobile terminal device 30 closest to the habitual shoplifter or suspicious behavior person the collation result with whom is a match based on the positional information acquired from the position determination unit 113, and transmits information regarding the habitual shoplifter or suspicious behavior person to this mobile terminal device 30.

Although the details will be described later, the transmission control unit 116 transmits to an employee closest to the position of a habitual shoplifter or suspicious behavior person a sound/a moving image/positional information of the suspicious behavior person (information of a layout having marking thereon) by e-mail. In the case of a multi-floored facility, the closeness is determined on a floor to floor basis. Also, the transmission is performed in a distinguishable manner with, for example, a red display of a habitual shoplifter and with, for example, a yellow display of a suspicious behavior person.

If there is no answer-back signal from the employee to whom the transmission was addressed even after an elapse of a predetermined time (for example, five seconds), the transmission control unit 116 chooses a second employee concerned person to perform a re-transmission to him/her. The second employee concerned person is (1) a concerned person such as an employee who is second closest to the habitual shoplifter or suspicious behavior person, (2) a security guard, a store manager, an assistant store manager, (3) the headquarters/head office.

Hereinafter, the operation of the smart-security digital system configured as described above will be described.

[Registration Processing]

Figure 4:
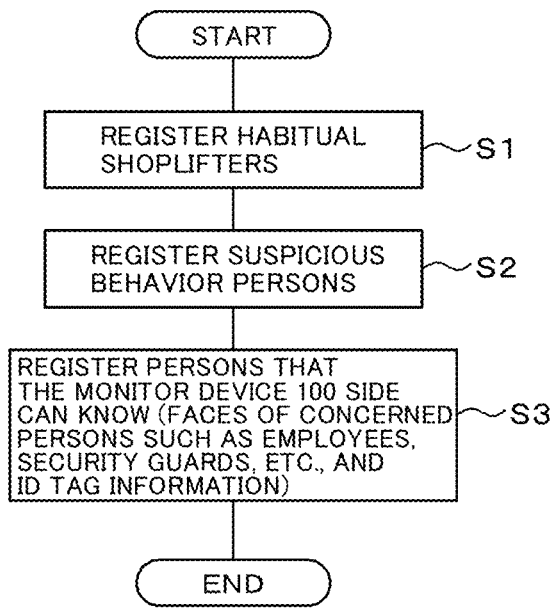
FIG. 4 is a flowchart showing a processing of registering persons by the control unit of the monitor device of the smart-security digital system according to the embodiment of the present invention.

First, a registration processing of various information of the smart-security digital system will be described. FIG. 4 is a flowchart showing a registration processing of persons by the control unit 110 of the monitor device 100 of the smart-security digital system. The present flow is executed by the control unit 110 (FIG. 3) of the monitor device 100.

In Step S1, the face authentication function unit 111 of the control unit 110 registers habitual shoplifters.

Even based on past cases, a person who performs an act of shoplifting is assumed to be greatly motivated by economic reasons and his/her personal habit. Therefore, a person who has a history of shoplifting in a store of a company in question is registered in advance as a habitual shoplifter in the face information DB 160. Specifically, the face authentication function unit 111 acquires, from face regions, information representing humans' facial characteristics (face information) to be used for face authentication, and registers the information in the face information DB 160 in association with the individual images. Also, the face authentication function unit 111 receives persons' images transmitted from the headquarters (not shown) and registers the images in the face information DB 160.

In step S2, the face authentication function unit 111 of the control unit 110 registers suspicious behavior persons. Registration of suspicious behavior persons uses, for example, numbers of eye contacts, and looking into a camera.

A person who is going to shoplift checks first whether or not a monitor camera is present at an out-of-sight place. A person who is going to shoplift moves his/her face, eyes, and visual line excessively frequently to check the presence of a monitor camera. In addition, before shoplifting, the person checks a location of a target item, a layout of a sales floor, a situation, and presence/absence and locations of employees and security guards. Therefore, a person who conspicuously needlessly moves, looks around to perform shoplifting, or stays for a while as compared with shoppers, is registered as a suspicious behavior person.

In Step S3, the face authentication function unit 111 of the control unit 110 registers persons who can be known by the monitor device 100 side (faces and ID tag information of concerned persons such as employees and security guards).

Next, a registration processing of a monitoring area layout of the smart-security digital system will be described.

Figure 5:
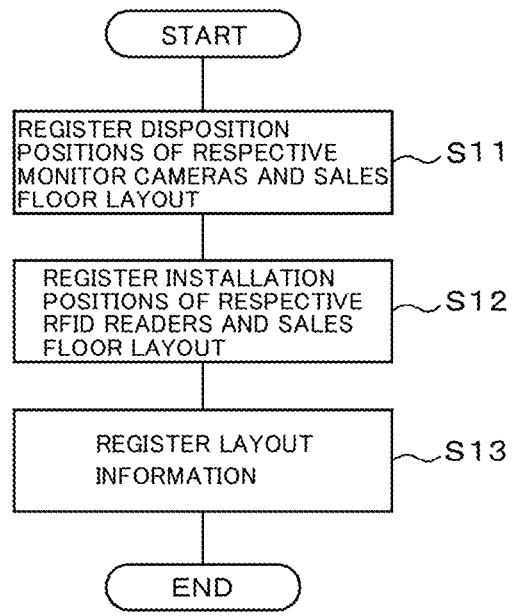
FIG. 5 is a flowchart showing a processing of registering a sales floor layout by the control unit of the monitor device of the smart-security digital system according to the embodiment of the present invention.

FIG. 5 is a flowchart showing a registration processing of a sales floor layout (monitoring target area) by the control unit 110 of the monitor device 100 of the smart-security digital system. The present flow is executed by the control unit 110 (FIG. 3) of the monitor device 100.

In step S11, the layout information storage unit 114 of the control unit 110 registers the disposition positions of the respective monitor cameras 11 and a sales floor layout (monitoring target area).

In step S12, the layout information storage unit 114 of the control unit 110 registers installation positions of the respective RFID readers 20 and a sales floor layout (monitoring target area).

In Step S13, the layout information storage unit 114 of the control unit 110 registers major layout information. The major layout information includes, for example, sales floor entrances/exits, floor numbers/sales floors, and floor numbers/tenant names.

[Monitoring Control of Monitor Device 100]

Figure 6:
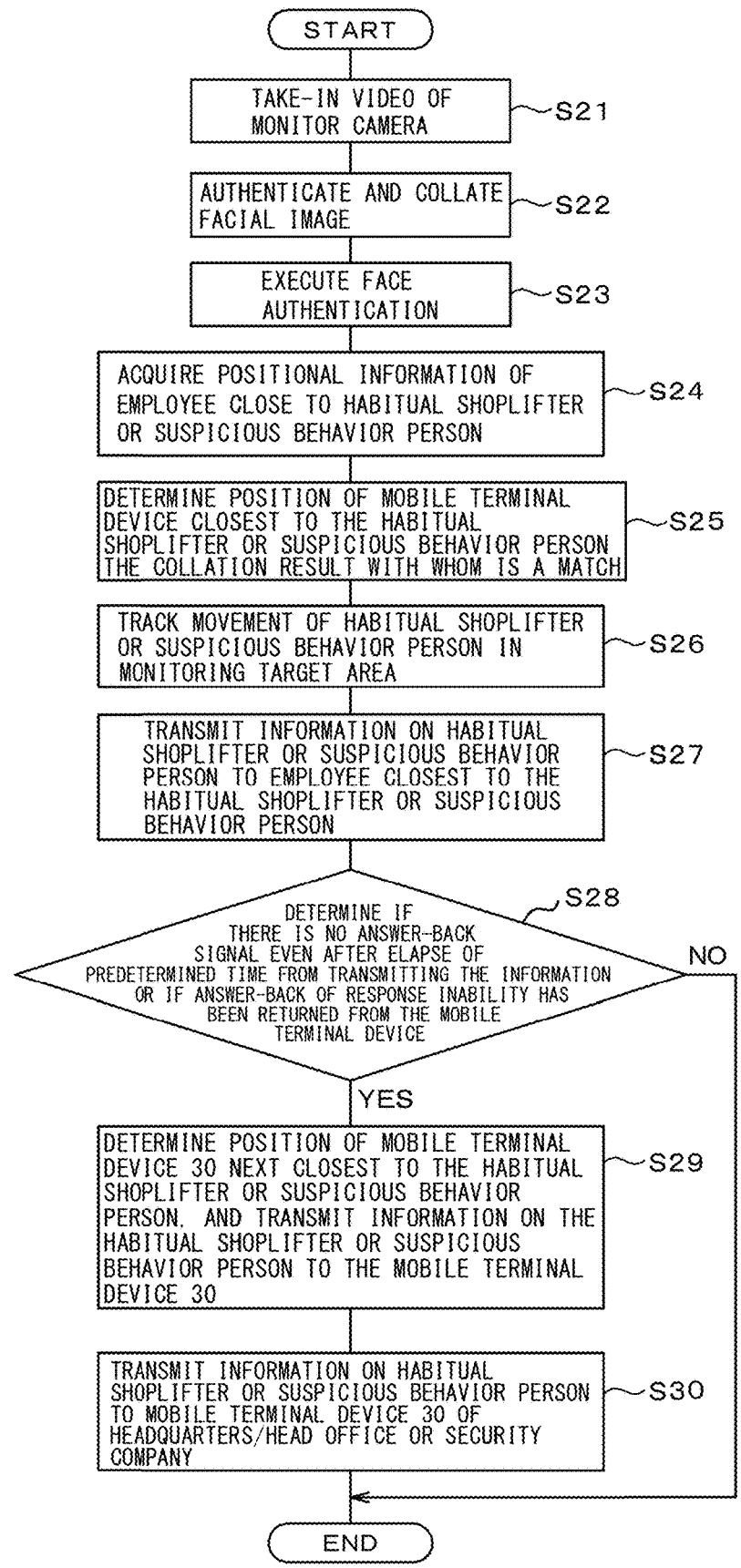
FIG. 6 is a flowchart showing a monitoring control processing of the monitor device of the smart-security digital system according to the embodiment of the present invention.

FIG. 6 is a flowchart showing a monitoring control processing of the monitor device 100 of the smart-security digital system. The present flow is executed mainly by the control unit 110 (FIG. 3) of the monitor device 100.

First, in step S21, the control unit 110 takes in a video of the monitor camera 11.

In step S22, the face authentication function unit 111 of the control unit 110 performs face authentication by collating a facial image of a person shot by the monitor camera 11 with facial images of habitual shoplifters or suspicious behavior persons accumulated in the face information DB 160.

In step S23, the face authentication function unit 111 of the control unit 110 collates, for authentication, a facial image of a person shot by the monitor camera 11 with facial images of habitual shoplifters or suspicious behavior persons accumulated in the face information DB 160.

When a result of collation by the face authentication function unit 111 is a match, in Step S24, the control unit 110 acquires positional information of employees close to the habitual shoplifter or suspicious behavior person from the position determination unit 113.

In Step S25, the control unit 110 determines a position of the mobile terminal device 30 closest to the habitual shoplifter or suspicious behavior person the collation result with whom is a match based on the acquired positional information.

In Step S26, the identified person tracking unit 115 of the control unit 110 tracks movement of the habitual shoplifter or suspicious behavior person in the monitoring target area.

In Step S27, the transmission control unit 116 of the control unit 110 transmits information regarding the habitual shoplifter or suspicious behavior person preferentially to an employee closest to the position of the habitual shoplifter or suspicious behavior person. For example, the transmission control unit 116 transmits a sound/a moving image/positional information of the suspicious behavior person (information of a sales floor layout having marking thereon) by e-mail.

In this case, if the habitual shoplifter or suspicious behavior person distances himself/herself from the position of the closest mobile terminal device 30 by a predetermined distance, the information regarding the habitual shoplifter or suspicious behavior person may be transmitted to another mobile terminal device 30.

Figure 7A:
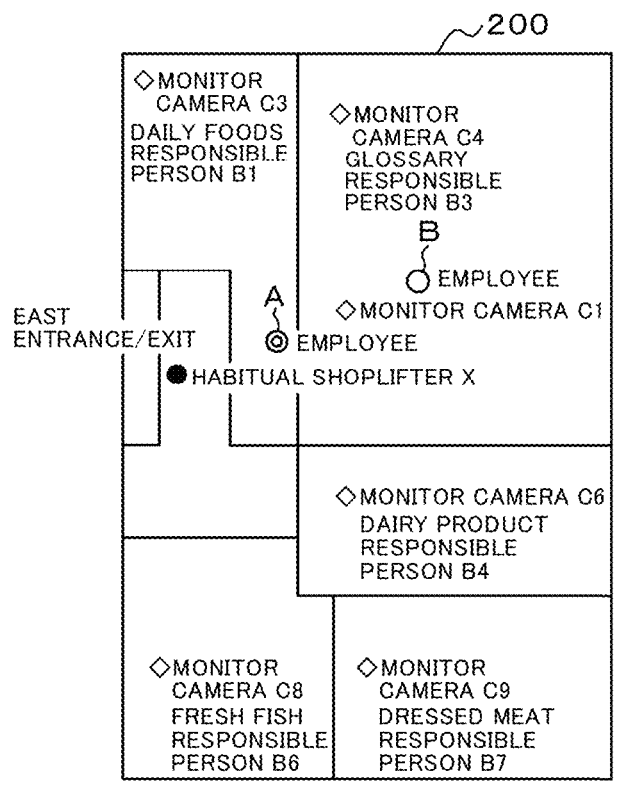
FIG. 7A is a view showing information on a habitual shoplifter or suspicious behavior person and a sales floor layout to be transmitted to an employee closest to the habitual shoplifter or suspicious behavior person in the smart-security digital system according to the embodiment of the present invention.
Figure 7B:
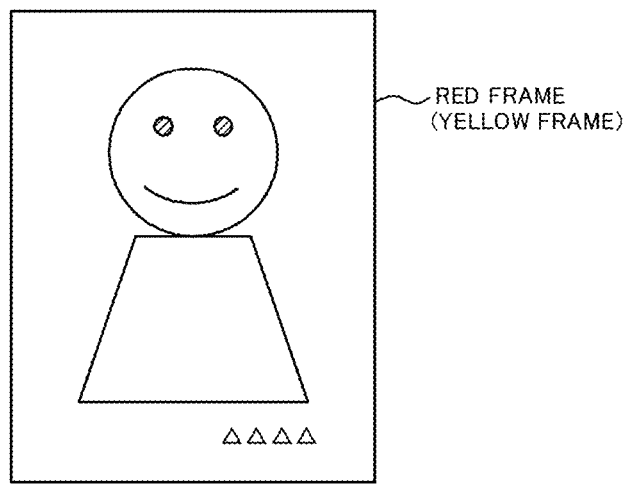
FIG. 7B is a view showing detailed information of a habitual shoplifter or suspicious behavior person to be transmitted to an employee closest to the habitual shoplifter or suspicious behavior person in the smart-security digital system according to the embodiment of the present invention.

FIGS. 7A and 7B are views of information on a habitual shoplifter or suspicious behavior person and a sales floor layout 200 (monitoring target area) to be transmitted to an employee present at the closest position. As shown in FIG. 7A, there is information for which the habitual shoplifter or suspicious behavior person (here, the habitual shoplifter X) "● (filled circle)," the employee A "◉ (double circle)" present at a position closest to the habitual shoplifter X "● (filled circle)," and other employees B "○ (open circle)" including the second-closest employee are plotted to overlap on the sales floor layout 200 (monitoring target area). In this case, a habitual shoplifter and a suspicious behavior person may be shown in different colors by, for example, a red "● mark" and a yellow "● mark," respectively, and doing this allows simply judging whether being a habitual shoplifter or a suspicious behavior person. Also, a sound and/or moving image regarding the habitual shoplifter or suspicious behavior person may be transmitted. Transmitting a sound and/or moving image together with an image allows knowing information that cannot be represented by only the image, and enabling the employee to take more appropriate actions. In addition, the sound function may be in a mode of allowing selecting whether to release the sound depending on the situation.

Also, to the employee A "◉ (double circle)" present at the closest position, more detailed information may be transmitted in order to monitor the habitual shoplifter X "● (filled circle)." Examples of more detailed information include detailed information on the sales floor layout 200 such as the floor-number name, sales floor name, and corner name, information excerpts from histories of the habitual shoplifter X "● (filled circle)," and guidelines for action to be taken by the employee. Also, as more detailed information, as shown in FIG. 7B, there can be information showing the habitual shoplifter X "● (filled circle)" with his/her "face" enlarged and detailed information "ΔΔΔ" on the habitual shoplifter X. In this case as well, a frame around the face of a habitual shoplifter and a frame around the face of a suspicious behavior person may be shown in different colors of, for example, red and yellow, respectively. Transmitting the above-described detailed information has an effect of further promoting prevention of omission of monitoring and erroneous identification.

Returning to the flow in FIG. 6, in step S28, the transmission control unit 116 determines if there is no answer-back signal (acknowledgement: ACK) even after an elapse of a predetermined time (for example, five seconds) from transmitting the information regarding the habitual shoplifter or suspicious behavior person to a mobile terminal device 30 of the employee present at the closest position or if an answer-back of response inability (negative-acknowledgement: NCK) has been returned from the mobile terminal device 30.

If there is no acknowledgement ACK even after an elapse of a predetermined time (for example, five seconds) from the mobile terminal device 30 or if a negative-acknowledgement NCK is returned from the mobile terminal device 30, the transmission control unit 116 determines the position of a mobile terminal device 30 next closest to the habitual shoplifter or suspicious behavior person the collation result with whom is a match, and transmits the information regarding the habitual shoplifter or suspicious behavior person to said mobile terminal device 30 in step S29.

The answer-back to be executed by the above-described employee is, specifically, if having received the information regarding the habitual shoplifter or suspicious behavior person transmitted from the monitor device 100, performing an operation of touching (or depressing) a predetermined button (for example, an "ANSWER-BACK" button) of the mobile terminal device 30 (smartphone 30a, tablet 30b, or notebook PC 30c) in a preset time (for example, five seconds). In response to this operation, the mobile terminal device 30 returns an answer-back (answer-back signal) to the monitor device 100, judging that the information on the habitual shoplifter or suspicious behavior person has been received and said employee has performed a checking operation.

As described above, if there is no acknowledgement ACK even after an elapse of a predetermined time (for example, five seconds) from the mobile terminal device 30 or if an answer-back of a negative-acknowledgement NCK has been returned from said mobile terminal device 30, the transmission control unit 116 chooses a second employee concerned person to perform a re-transmission to him/her. The second employee concerned person is (1) a concerned person such as an employee who is second closest to the suspicious person, (2) a security guard, a store manager, an assistant store manager, (3) the headquarters/head office affiliates, or the like.

In step S30, the transmission control unit 116 transmits the information regarding the habitual shoplifter or suspicious behavior person to the mobile terminal device 30 of the headquarters/head office or security company, and ends the present flow.

Figure 8:
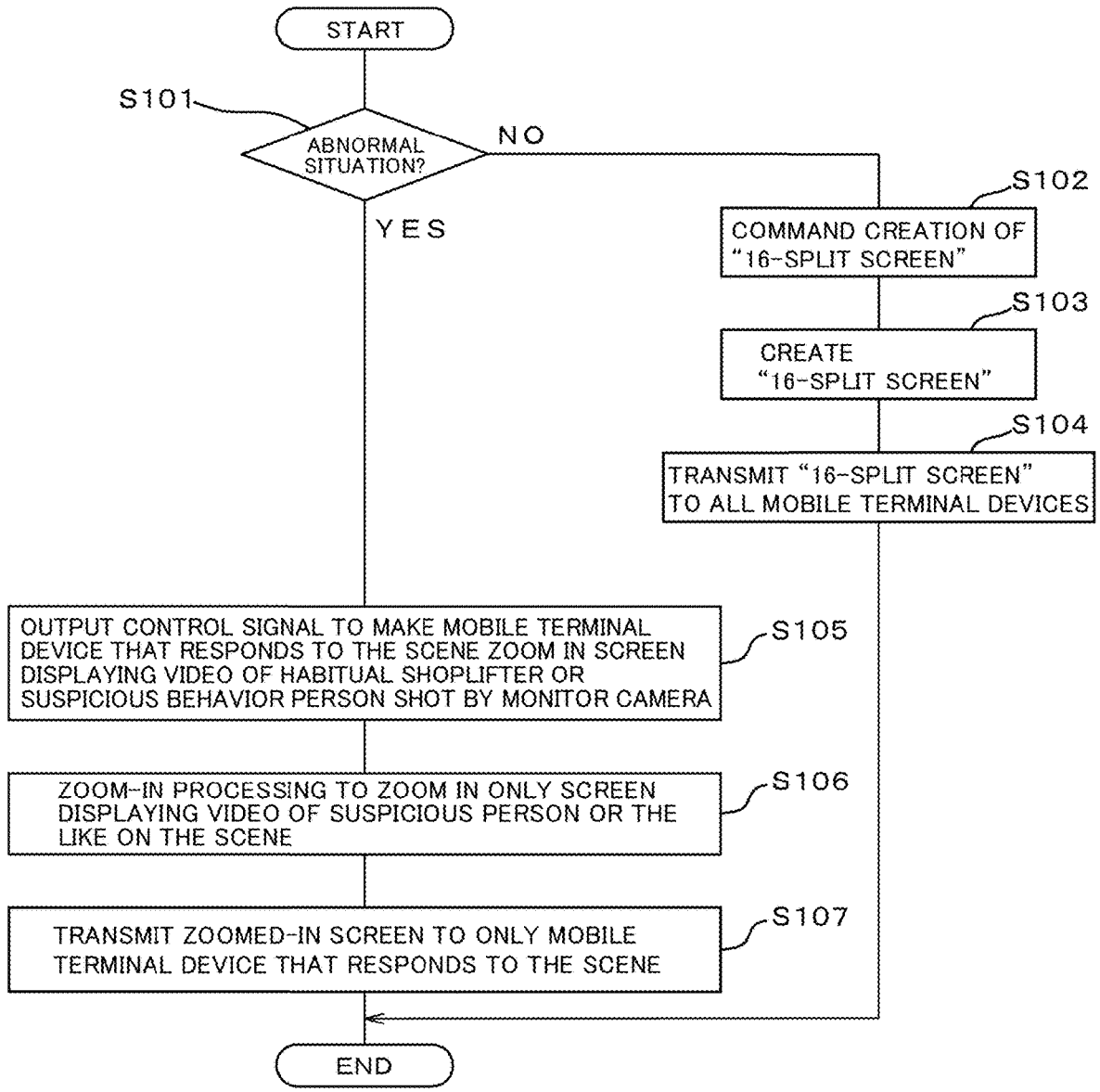
FIG. 8 is a flowchart showing a zoom-in processing of the control unit of the monitor device of the smart-security digital system according to the embodiment of the present invention.

FIG. 8 is a flowchart showing a zoom-in processing of the control unit 110 of the monitor device 100 of the smart-security digital system. The present flow is executed in parallel with monitoring control shown in FIG. 6, and displaying is performed by using a plurality of screens of a mobile terminal device as necessary.

First, in Step S101, the control unit 110 determines whether an abnormal situation such as a situation where a habitual shoplifter or suspicious behavior person has been found has arisen.

When no abnormal situation arises, in Step S102, the control unit 110 outputs a control signal to command the image processing unit 170 (FIG. 1) to create an image of a "16-split screen" (FIG. 2A) as a display screen for a normal situation.

In Step S103, based on this control signal, the image processing unit 170 creates a "16-split screen" (FIG. 2A) for a normal situation.

Next, in Step S104, the control unit 110 transmits the created "16-split screen" (FIG. 2A) to display screens 50 of all mobile terminal devices 30 and a management center (not shown) connected to the network (FIG. 1), and ends the present flow. Accordingly, in a normal situation, the "16-split screen" (FIG. 2A) is displayed on the display screens 50 of the mobile terminal devices 30 of the respective employees. In addition, the management center and headquarters, etc., can grasp a situation such as a condition of the store by monitoring the "16-split screen" of the mobile terminal device 30 of each employee.

On the other hand, when an abnormal situation is determined in Step S101 described above, in Step S105, the control unit 110 outputs a control signal to the image processing unit 170 to make a mobile terminal device 30 of an employee who rushes to the scene zoom in a sub-screen (FIG. 2A) displaying a video of a habitual shoplifter or suspicious behavior person shot by the monitor camera 30 to the size of the display screen 50 of the mobile terminal device 30.

In Step S106, based on the control signal commanding zooming-in, the image processing unit 170 performs a zoom-in processing to zoom in only the sub-screen (FIG. 2A) displaying the video of the habitual shoplifter or suspicious behavior person shot by the monitor camera 30 to the size of the display screen 50 of the mobile terminal device 30. Accordingly, the video of the suspicious person shot by the monitor camera 30 is zoomed in in the mobile terminal device 30 closest to this monitor camera.

In Step S107, in an abnormal situation, the control unit 110 transmits a zoomed-in screen (FIG. 2B) zooming-in an image of the suspicious person or the like shot by the monitor camera 11 (one of sub-screens of the 16-split screen) to only the mobile terminal device 30 that rushes to the scene, and ends the present flow. In addition, the control unit 110 transmits the same "16-split screen" as in a normal situation to other mobile terminal devices 30. Accordingly, in an abnormal situation, on the mobile terminal device 30 that rushes to the scene, the zoomed-in screen (FIG. 2B) zooming-in the video of the suspicious person or the like is displayed.

[Monitoring Control of Mobile Terminal Device 30]

Figure 9:
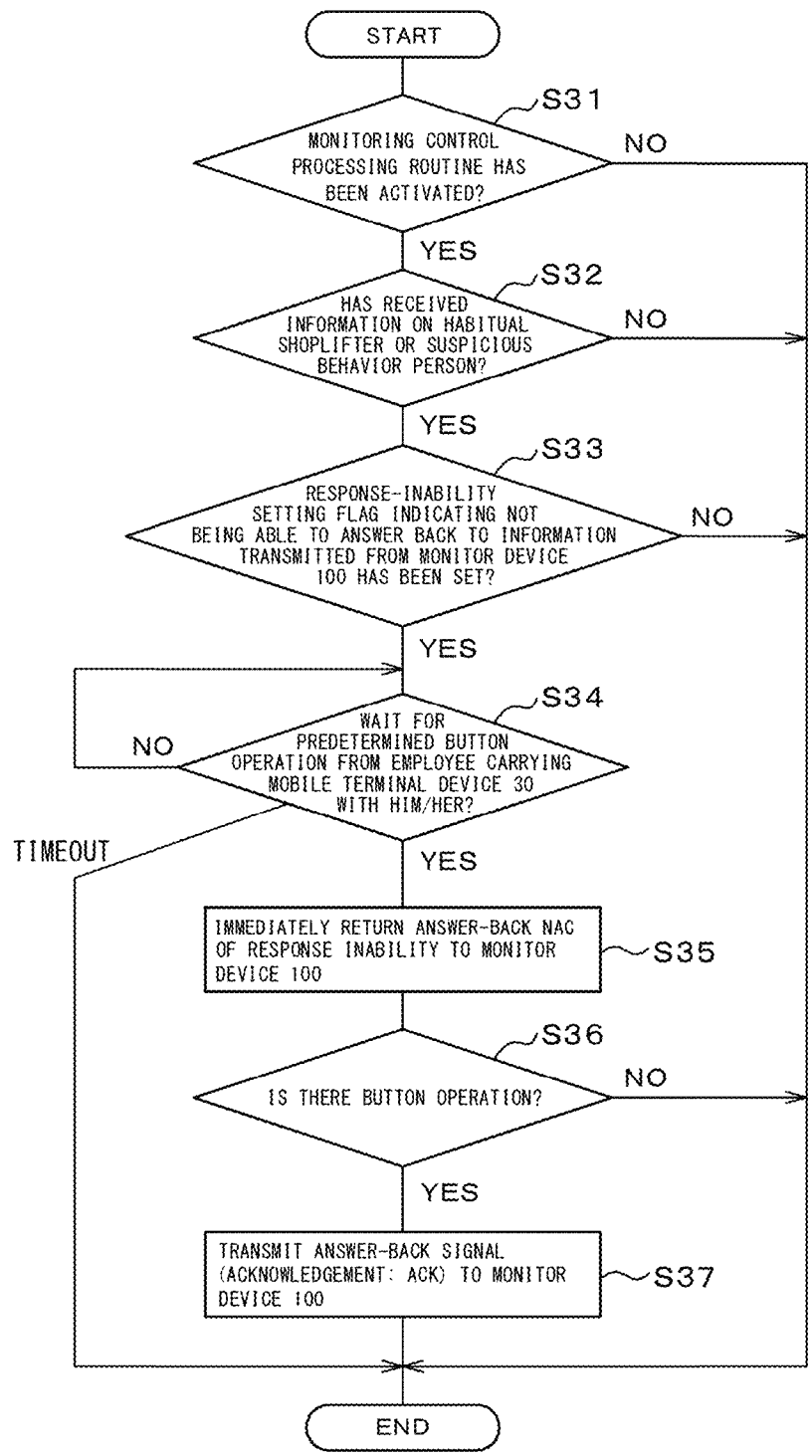
FIG. 9 is a flowchart showing a monitoring control processing of a mobile terminal device of the smart-security digital system according to the embodiment of the present invention.

FIG. 9 is a flowchart showing a monitoring control processing of the mobile terminal device 30 of the smart-security digital system. The present flow is executed by the control unit (not shown) of the mobile terminal device 30.

First, in Step S31, the control unit of the mobile terminal device 30 determines whether the present monitoring control processing routine has been activated, and directly ends the present flow if the present monitoring control processing routine has not been activated.

If the present monitoring control processing routine has been activated, the control unit of the mobile terminal device 30 determines in step S32 whether it has received information on a habitual shoplifter or suspicious behavior person transmitted from the monitor device 100.

If having not received the information on a habitual shoplifter or suspicious behavior person described above, the control unit of the mobile terminal device 30 directly ends the present flow.

If having received the information on a habitual shoplifter or suspicious behavior person described above, the response-inability setting unit 31 of the mobile terminal device 30 determines in step S33 whether a response-inability setting flag indicating not being able to answer back to information transmitted from the monitor device 100 has been set. In addition, the setting of the response-inability setting flag may be, for example, completed by holding down a predetermined button during the present monitoring control processing routine is being activated, and cancelled by again holding down the predetermined button after the completion of setting.

If the response-inability setting flag has been set, the response-inability setting unit 31 of the mobile terminal device 30 immediately returns an answer-back NAC of response inability to the monitor device 100 in step S34 to end the present flow.

If the response-inability setting flag has not been set, the control unit of the mobile terminal device 30 waits for a predetermined button (for example, an "ANSWER-BACK" button) operation from an employee carrying this mobile terminal device 30 with him/her in step S35.

If there is a button operation described above, the control unit of the mobile terminal device 30 transmits an answer-back signal (acknowledgement: ACK) to the monitor device 100 in step S36 to end the present flow. In addition, if there is no button operation even after an elapse of a predetermined time, the control unit of the mobile terminal device 30 performs a timeout in step S37 to end the present flow.

Application Example 1

Description will now be given, in the case of sales floors of a commercial facility, of a sales floor configuration of the smart-security digital system 1000.

Figure 10A:
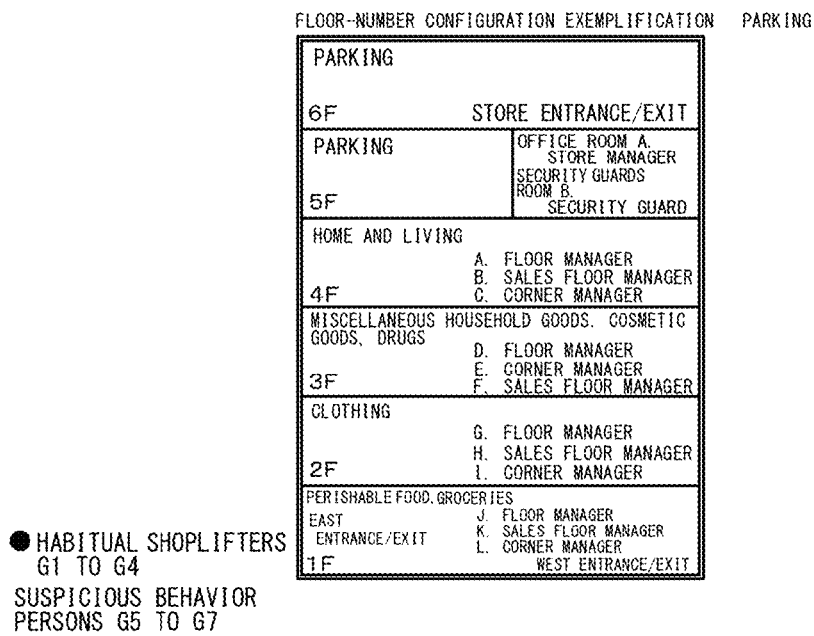
FIG. 10A is a view showing an example of a sales floor layout of the smart-security digital system according to the embodiment of the present invention.
Figure 10B:
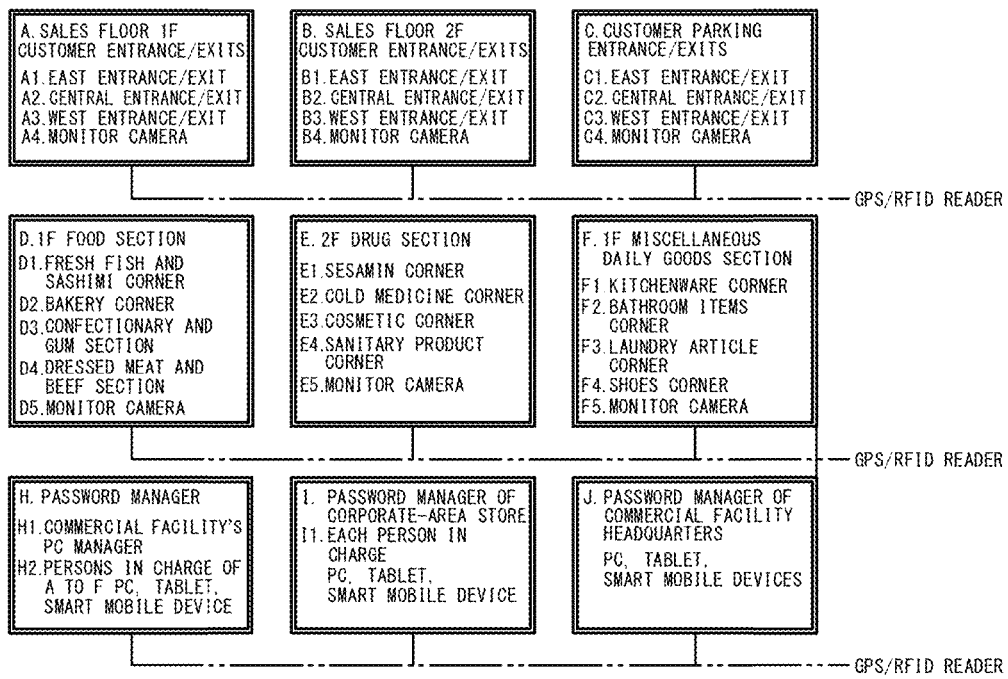
FIG. 10B is a view showing an example of a sales floor layout of the smart-security digital system according to the embodiment of the present invention.

FIG. 10A and FIG. 10B are views showing an example of a sales floor layout of the smart-security digital system.

In the smart-security digital system 1000, the monitor device 100 stores sales floor layout positional information, positional information of the RFID readers 20 on the sales floor layout 200, and employees' positional information acquired by the RFID readers 20.

In the sales floor corners, the monitor cameras 11 and the RFID readers 20 are respectively installed. If GPS radio waves are unstable and the radio waves do not reach, positional information can be acquired by the RFID reader 20.

The monitor device 100, if having recognized a habitual shoplifter or suspicious behavior person by the monitor camera 11, displays on a sales floor layout of the display unit 140 where the habitual shoplifter or suspicious behavior person is present in terms of floor number, entrance, sales floor name, and corner (refer to FIG. 7) name.

The monitor device 100 recognizes positional information by the monitor camera 11 on a habitual shoplifter or suspicious behavior person who has come to the store. The monitor device 100 then recognizes positional information of a sales floor manager, security guards, and a store manager by a GPS function or the RFID readers 20. The monitor device 100 then determines which employee is close to the habitual shoplifter or suspicious behavior person, and transmits information (such as positional information, a shot image, and a facial image) on the habitual shoplifter or suspicious behavior person together with an e-mail message, a moving image, and a sales floor layout in real time to an employee present at a position closest to the habitual shoplifter or suspicious behavior person. The employee present at a position close to the habitual shoplifter or suspicious behavior person can rush quickly thereto to appropriately respond thereto beforehand and can thus prevent damage from shoplifting.

The monitor device 100 preferably chooses, as positional information of employees in the sales floors, a building, a floor number, and a sales floor, etc., by the transmitting and receiving GPS functions or the RFID readers 20.

After transmitting information (such as positional information, a shot image, and a facial image) on the habitual shoplifter or suspicious behavior person together with an e-mail message, a moving image, and a sales floor layout in real time to an employee present at the closest position, the monitor device 100 may simultaneously transmit these to employees at a nearby entrance/exit and a sales floor corner and on the same floor, or the security guards and a store manager, as needed, besides said employee.

In addition, the monitor device 100 may transmit more detailed information to the closest employee described above. Examples of more detailed information that can be mentioned include information for which positional information of the habitual shoplifter and employees is displayed to overlap a floor-number name, sales floor name, and corner name layout drawing, and information showing the habitual shoplifter with his/her "face" enlarged. This has an effect of preventing omission of monitoring and erroneous identification.

In a building where GPS radio waves can be received, employees' positional information is acquired using a GPS function. In a building, sales floor, and the like where GPS radio waves cannot be received, employees' positional information is acquired by the RFID readers 20.

The monitor cameras 11 are preferably installed in a plurality of numbers at entrances/exits of the sales floors, where shoplifting occurred, where not in direct sight of employees, aisles, etc.

The monitor device 100 has stored in advance positional information by the monitor cameras 11, corresponding floor numbers, sales floors, floors, entrances/exits, and recognized person(s) to be searched, and ranges in which the monitor cameras 11 can authenticate habitual shoplifters. For example, the monitor device 100 stores a floor-number name, a sales floor name, a corner name, and a sales floor layout. An employee can rush quickly to the location of a corresponding habitual shoplifter or suspicious behavior person.

For example, in FIG. 10A, when a habitual shoplifter g1, g2, g3, or g4 (for example, shown with a ● mark or a red face frame) or a suspicious behavior person g5, g6, or g7 (for example, shown with a ● mark or yellow face frame) comes to the store, the monitor device 100 determines where the habitual shoplifter g1, g2, g3, or g4 or suspicious behavior person g5, g6, or g7 is present in the "entrance/exit," "floor number," "sales floor," and "corner," etc., on the sales floor layout, and transmits in real time information on the habitual shoplifter g1, g2, g3, or g4 or suspicious behavior person g5, g6, or g7 to an employee present at the closest position or, if there is no answer back from the closest employee, an employee present at a next closest position, and concerned persons other than employees. "transmits information to an employee" means transmission of said information by e-mail message to a PC, tablet, or smart mobile device that the employee carries with him/her. Accordingly, the employee can quickly rush to a corresponding position before an act of shoplifting or a suspicious behavior is performed, and such an act can be prevented.

Here, the information on the habitual shoplifter g1, g2, g3, or g4 or suspicious behavior person g5, g6, or g7 can be transmitted to a commercial facility concerned person, a corporate-area store, or concerned headquarters holding passwords as well. Accordingly, when the habitual shoplifter g1, g2, g3, or g4 or suspicious behavior person g5, g6, or g7 comes to the store, a commercial facility concerned person can know and respond thereto. The commercial facility concerned person can respond to the habitual shoplifter or suspicious behavior person in liaison with a person in direct charge of the sales floor in question.

Also, the smart-security digital system can respond to large scale facilities on the order of 50 m×200 m per floor with three to four floors, convenience stores, commercial facilities respectively consisting of malls, respective stores attached to terminals, complex building hospitals, hotels, and cultural facilities, etc., as well.

Application Example 2

Figure 11A:
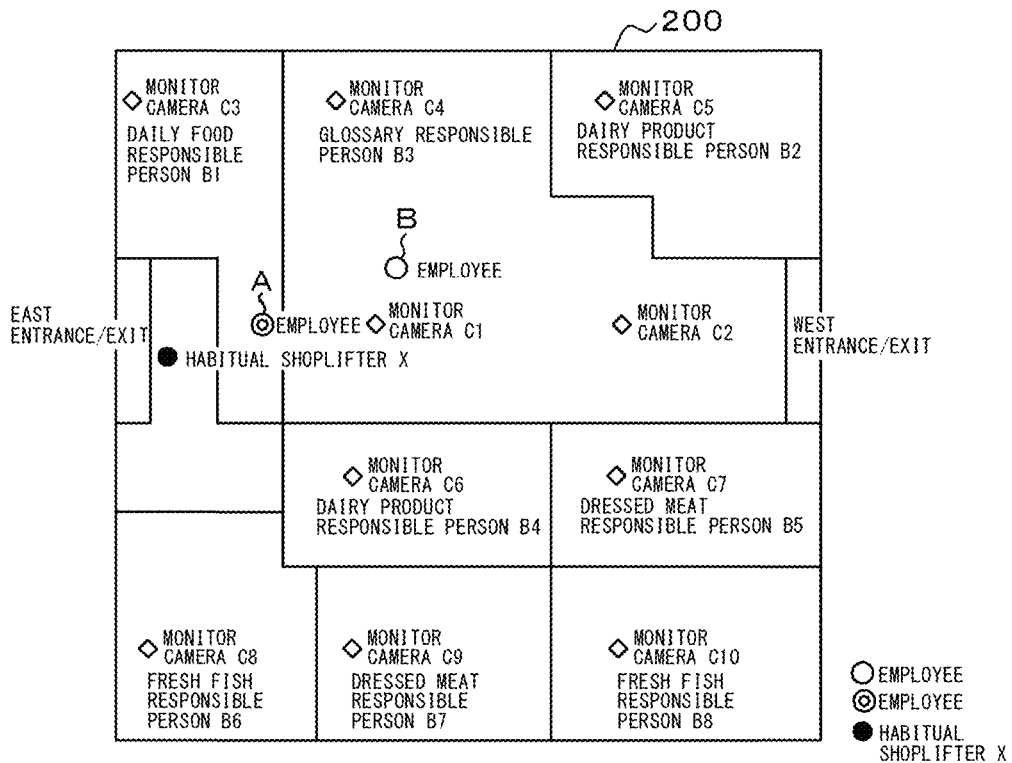
FIG. 11A is a view showing an example of a sales floor layout of the smart-security digital system according to the embodiment of the present invention.
Figure 11B:
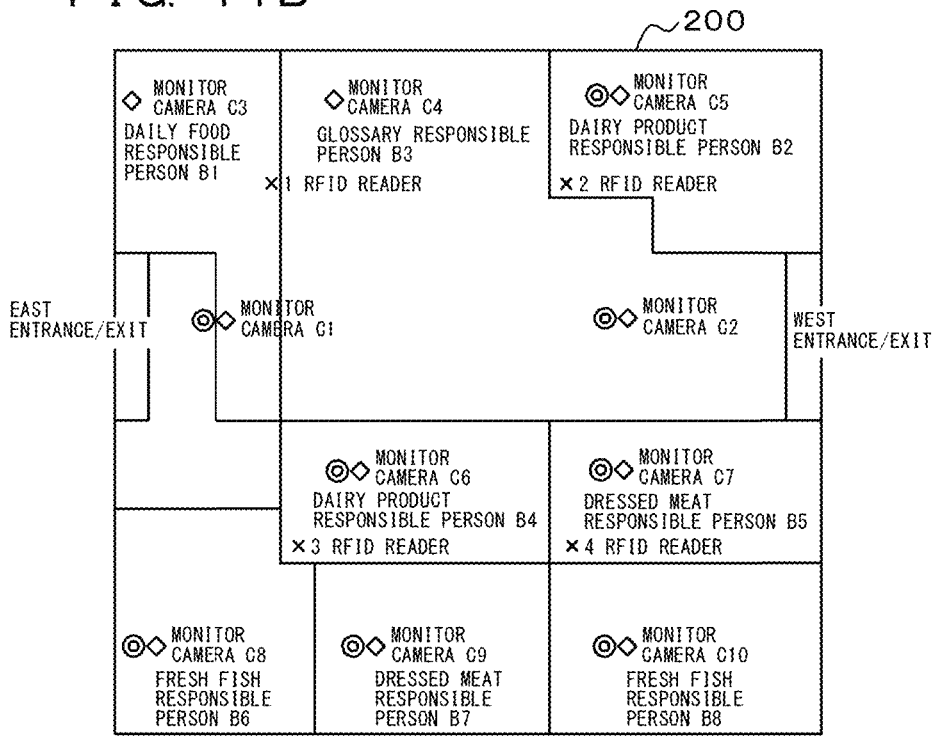
FIG. 11B is a view showing an example of a sales floor layout of the smart-security digital system according to the embodiment of the present invention.

FIGS. 11A and 11B include views showing an example of a sales floor layout of the smart-security digital system. FIG. 11A is a first-floor sales floor planar layout with a GPS and an arrangement plan of monitor cameras 11, and FIG. 11B is a first-floor sales floor planar layout by "X marks" of RFID readers and an arrangement plan of monitor cameras. In addition, other floors also have almost the same sales floor layout.

<Habitual Shoplifter: Single>

As shown in FIG. 11A, it is assumed that a habitual shoplifter X has come to the store from the 1st-floor east entrance/exit.

The monitor device 100 focuses on and tracks the habitual shoplifter X "● (filled circle)" by the monitor cameras 11.

The monitor device 100 transmits information on the habitual shoplifter X (refer to FIG. 7A) to the mobile terminal device 30 (smartphone 30a, tablet 30b, or notebook PC 30c) that the 1st-floor employee A "◉ (double circle)" present at the closest position carries with him/her. Here, the information on the habitual shoplifter X is overlapped on the sales floor layout 200. As shown in FIG. 11, information for which the habitual shoplifter "● (filled circle)," the employee A "◉ (double circle)" present at the closest position, and another employee B "○ (open circle)" at the second closest position are plotted to overlap on the sales floor layout 200 (monitoring target area) is transmitted. In this case, the tracked person is a habitual shoplifter, and is shown with a red "● (filled circle)." On the corresponding sales floor layout 200, the position of the habitual shoplifter X "● (filled circle)" and positions of sales floor managers (employees) b1 to b8 are shown, so that a positional relationship between the habitual shoplifter X "● (filled circle)" and the sales floor managers b1 to b8 becomes clear. The mobile terminal device 30 of the sales floor manager (employee) A "◉ (double circle)" may further activate a warning sound or a vibrator. The sales floor manager (employee) A "◉ (double circle)" can fix his/her eyes on behavior of the habitual shoplifter X "● (filled circle)." In this example, the sales floor manager (employee) A "◉ (double circle)" can shift to an initial response to the habitual shoplifter X "● (filled circle)," that is, monitoring behavior from the most important initial period when the habitual shoplifter comes to the store, and can check initial action of the habitual shoplifter X "● (filled circle)" and prevent an act of shoplifting.

Thereafter, when the habitual shoplifter X "● (filled circle)" shifts to walking through each sales floor on each floor while surveying the situation without an act of shoplifting, the monitor cameras C2 to C10 that have focused on the habitual shoplifter "● (filled circle)" performs focusing in accordance with the walk of the habitual shoplifter "● (filled circle)." This tracking function is performed by the identified person tracking unit 115 of the control unit 110 (refer to FIG. 3). The identified person tracking unit 115 detects a person identified to be a habitual shoplifter or suspicious behavior person by tracking with other monitor cameras 11 (refer to FIG. 1), and checks a movement history in the monitoring target area.

The monitor device 100 transmits information on the habitual shoplifter X (refer to FIG. 7A) to the mobile terminal device 30 (smartphone 30a, tablet 30b, or notebook PC 30c) that the 1st-floor sales floor manager (employee) A "◉ (double circle)" at the closest position carries with him/her. In this case, the 1st-floor employees are sales floor managers b1 to b8 of the corresponding sales floors. Detailed information on the habitual shoplifter X (refer to FIG. 7B) is transmitted to the sales floor manager closest to the habitual shoplifter X "● (filled circle)" among the sales floor managers b1 to b8.

When the habitual shoplifter "● (filled circle)" moves to the 2nd floor, 3rd floor, or 4th floor, the same monitoring function is also executed in other sales floors.

<Habitual Shoplifter: Multiple>

When multiple (for example, seven) habitual shoplifters come to the store at the same time, the monitor device 100 determines them as habitual shoplifters by face authentication. Even when multiple habitual shoplifters come to the store, as in the case where a single habitual shoplifter comes to the store, information on the habitual shoplifters (refer to FIG. 7A) are transmitted to the respective mobile terminal devices that employees at positions closest to the habitual shoplifters carry with them at each sales floor on each floor. Even when multiple habitual shoplifters attempt to perform an act of shoplifting, the employees at the closest positions monitor them in real time, so that the habitual shoplifters cannot perform an act of shoplifting. In addition, the corresponding employees accurately monitor behavior of the habitual shoplifters from positions near the habitual shoplifters, so that misunderstanding is rarely generated. Also, such habitual shoplifters can be recognized and cumulatively stored.

<Suspicious Behavior Person>

The monitor device 100 registers, as a suspicious behavior target, a face of a person who is not a habitual shoplifter but repeatedly (for example, 4 or 5 times) passes through each sales floor on each floor in the store or repeatedly (for example, 4 or 5 times) looks at the monitor camera 11 (refer to the person registration processing in FIG. 4). The monitor device 100 can monitor this suspicious behavior person by the same method as in the case of a habitual shoplifter. However, for the store or the like, such a suspicious behavior person is considered to bring less actual harm (economic loss) than a habitual shoplifter, so that a mode in which the level of monitoring is set to be lower than in the case of a habitual shoplifter can also be adopted. For example, both of a habitual shoplifter and a suspicious behavior person come to the store, priority is placed on execution of the present system for a habitual shoplifter, notification to headquarters/head office is not performed, and a waiting time for the answer-back signal is set to be longer (set to, for example, 10 seconds). The monitor device 100 may cumulatively store suspicious behavior persons in advance, and transmit a message of caution needed when a face of a suspicious behavior person cumulatively stored is recognized.

<Detailed Example of Monitoring of Habitual Shoplifter>

It is assumed that the habitual shoplifter X "● (filled circle)" shown in FIG. 11A has come to a focus section of the monitor camera 11 in the corner C5 in which the dairy product responsible person b2 is present. The monitor device 100 transmits information on the habitual shoplifter X (refer to FIG. 7A) to the mobile terminal device 30 (smartphone 30*a*, tablet 30*b*, or notebook PC 30*c*) that the dairy product responsible person (employee) b2 (here, an employee at the closest position) carries with him/her. From the dairy product responsible person b2 (employee) who received this information, if there is no answer-back operation (mail pushing operation, etc.) in a predetermined time (for example, five seconds), said information is re-transmitted to an employee B "○ (open circle)" second closest to the habitual shoplifter X "● (filled circle)." In this case, along with re-transmission to the second closest employee B "○ (open circle)," the same transmission recovery to the sales floor managers of every floor, security guards, and the store manager may be performed.

When the habitual shoplifter X "● (filled circle)" successively moves to the corners of the respective departments, corresponding transmission recovery to the sales floor managers of every floor, security guards, and the store manager is preferably performed. Doing this allows more effective shoplifting prevention.

For example, when the habitual shoplifter X "● (filled circle)" moves from the 1st floor to the respective 2nd, 3rd, and 4th floors, an employee of each sales floor cannot respond thereto alone. Therefore, when the habitual shoplifter X "● (filled circle)" acts to move to each floor, the monitor device 100 transmits information on the habitual shoplifter X (refer to FIG. 7A) to the mobile terminal devices 30 (smartphones 30*a*, tablets 30*b*, or notebook PCs 30*c*) that security guards, the store manager, and the assistant store manager or the like who administer the overall store carry with them. Doing this allows tracking and monitoring even when the habitual shoplifter moves to each floor, and effective measures to be taken to prevent shoplifting.

As described above, according to the present embodiment, the smart-security digital system 1000 comprises mobile terminal devices 30 that a plurality of employees respectively carry with them in a store, a position determination unit 113 that acquires positional information of the plurality of mobile terminal devices 30 in a monitoring target area, a face authentication function unit 111 that collates a facial image of a person shot by a monitor camera 11 with facial images of habitual shoplifters or suspicious behavior persons accumulated in an information image DB 160, a control unit 110 that determines, when a result of collation by the face authentication function unit 11 is a match, a position of a mobile terminal device 30 closest to the habitual shoplifter or suspicious behavior person the collation result with whom is a match based on positional information acquired from the position determination unit 113, and transmits information on the habitual shoplifter or suspicious behavior person to said mobile terminal device 30, and an image processing unit 170 that synthesizes videos shot by monitor cameras 11 into a display screen consisting of a plurality of split screens, and performs a zoom-in processing to zoom in one of the split screens. The control unit 110 transmits information on the habitual shoplifter or suspicious behavior person, and on a display screen of the mobile terminal device 30 that quickly rushes to the habitual shoplifter or suspicious behavior person, zooms in a screen displaying a video of the suspicious person or the like shot by the monitor camera 30.

With this configuration, when there is a habitual shoplifter or suspicious behavior person, an employee or the like close to him/her can quickly rush to the scene in real time and prevent an act of shoplifting. In particular, the display screen of the mobile terminal device 30 that quickly rushes to the scene zooms in a screen (FIG. 2B) displaying a video of the suspicious person or the like including a video of a monitoring region on the scene, shot by the monitor camera 30, so that a situation on the scene can be grasped in detail, and a more appropriate response can be made. From a standpoint of an employee, based on sudden switching of the display screen of the employee's own mobile terminal device 30 from the normal "16-split screen display" to the zoomed-in screen (FIG. 2B), the employee can clearly know that an abnormal situation has occurred and he/she has been commanded to quickly rush to the scene. A management center or headquarters can recognize an emergency situation of the store based on switching of the "16-split screen display" to an emergency screen, and grasp a state of response to the emergency.

Also, in the present embodiment, the mobile terminal device 30 includes the response-inability setting unit 31 that presets not being able to answer back to information transmitted from the control unit 110, and when the response-inability setting unit 31 has set being in response inability, returns an answer-back of said response inability if transmission of information is received from the monitor device 100. Accordingly, the monitor device 100 can transmit the above-described information to a second-closest employee or responsible person without waiting for an answer-back from the mobile terminal device 30 for a predetermined time (for example, five seconds). An act of shoplifting is performed in a moment, so that the effect of receiving support from the next closest employee and a responsible person without waiting for a predetermined time (for example, 5 seconds) is significant. That is, in the smart-security digital system 1000, the monitor device 100 and the mobile terminal devices 30 can respond to a time-sensitive situation in conjunction with each other.

In actual operation, employees may go to a warehouse or go to the bathroom, and thus do not always stay in fixed positions. For this reason, in the conventional system, reporting to an employee to whom a report is to be made has not been feasible in some cases. In the present embodiment, because the mobile terminal devices 30 can perform a setting for making the same report-off (meaning that the employee is in response inability for being in the bathroom or the like), there is no load on the side of the monitor device 100.

The above description is an exemplification of a preferred embodiment of the present invention, and the scope of the present invention is not limited thereto. For example, in the present embodiment, a description has been given of the case of using the telephone line 210 as a public line, but the present invention is not limited to this case, and for example, a radio communication line, the Internet, or a LAN, etc., may be used as a public line. Moreover, according to the type of public line, a transceiver may be used as the communication terminal device when the public line is radio communication, and a personal computer or a palmtop computer may be used as the communication terminal device when the public line is the Internet or a LAN. Thus constructing a smart-security digital system using an existing public line allows expanding the usage form of a smart-security digital system and allows suppressing the construction costs of a smart-security digital system.

Moreover, the title of a smart-security digital system and method has been used in the present embodiment, but this is for convenience of description, and the title may be digital-smart security, a crime-prevention system, a security method, or the like.

Further, detection of an abnormal situation covers all of publicly-known matters. Examples of the abnormal situation are intrusion or approach of a suspicious behavior person(s). Also, the report may be any, without being limited to an e-mail message.

Also, a smart-security digital system and method of the present invention can also be realized by a program to operate a computer as the present smart-security digital system or method. This program may be stored in a storage medium that can be read by a computer.

This storage medium recorded with the program may be a ROM itself of the present smart-security digital system, or may be a storage medium such as a CD-ROM that can be read, when a program reading device such as a CD-ROM drive is provided as an external storage device, by inserting the storage medium therein.

Moreover, the above-described storage medium may be a magnetic tape, a cassette tape, a flexible disk, a hard disk, an MO/MD/DVD or the like, or a semiconductor memory.

All publications, patents and patent applications cited in the present specification are hereby incorporated as reference in their entirety.

INDUSTRIAL APPLICABILITY

The smart-security digital system, method and program according to the present invention provide real-time responses in corporate and commercial facilities, offices, and the like to prevent loss of property and life and economic loss, whereby providing great utilization effects.

REFERENCE SIGNS LIST

11 Monitor camera
20 RFID reader
21 Authentication tag
30 Mobile terminal device
40 GPS
50 Display screen
100 Monitor device
110 Control unit (control means)
120 Input unit
130 Storage unit
140 Display unit
150 Output unit
160 Face information database (DB) (facial image storing means)
170 Image processing unit (image processing means)
180 Interface (I/F) unit
190 Communication unit
111 Face authentication function unit (face authentication collating means)
112 Specific person identification unit
113 Position determination unit (positional information acquiring means)
114 Layout information storage unit
115 Identified person tracking unit
116 Transmission control unit
200 Sales floor layout (monitoring target area)
1000 Smart-security digital system

The invention claimed is:

1. A smart-security digital system that prevents shoplifting of a habitual shoplifter or the like by monitoring videos shot by monitor cameras installed to shoot predetermined monitoring target areas in a store, comprising:
   a positional information acquiring means configured to acquire positional information of mobile terminal devices that a plurality of employees respectively carry with them in the store;
   a facial image storing means configured to accumulate facial images of habitual shoplifters or suspicious behavior persons;
   a face authentication collating means configured to collate a facial image of a person shot by one of the monitor cameras with the facial images of habitual shoplifters or suspicious behavior persons accumulated in the facial image storing means;
   a control means configured to determine, when a result of collation by the face authentication collating means is a match, a position of a first mobile terminal device closest to the habitual shoplifter or suspicious behavior person the collation result with whom is a match based on the positional information acquired from the positional information acquiring means, and transmits information on the habitual shoplifter or suspicious behavior person to the first mobile terminal device;
   a monitor device configured to synthesize the videos shot by the monitor cameras into a display screen consisting of a plurality of split screens, and performs a zoom-in processing to zoom in one of the split screens; and
   each of the mobile terminal devices includes a response-inability setting unit that presets not being able to answer back to the information on the habitual shoplifter or suspicious behavior person transmitted from the monitor device, and when response inability is set by said response-inability setting unit of the first mobile terminal device and the first mobile terminal device receives the information on the habitual shoplifter or suspicious behavior person, the first mobile terminal device is configured to return an answer-back of said response inability to the monitor device, wherein
   the control means determines, when an answer-back of response inability is returned from the first mobile terminal device, a position of a second mobile terminal device next closest to the habitual shoplifter or suspicious behavior person the collation result with whom is a match, transmits the information on the habitual shoplifter or suspicious behavior person to said second mobile terminal device, and on a display screen of said second mobile terminal device, zooms in a screen displaying one of the videos of the habitual shoplifter or suspicious behavior person shot by one of the monitor cameras.

2. The smart-security digital system according to claim 1, wherein the information on the habitual shoplifter or suspicious behavior person includes information of a position of the habitual shoplifter or suspicious behavior person and a position of the first or second mobile terminal device to which said information was transmitted, overlapped on the monitoring target area.

3. The smart-security digital system according to claim 1, wherein the information on the habitual shoplifter or suspicious behavior person includes a facial image of the habitual shoplifter or suspicious behavior person present in the monitoring target area.

4. The smart-security digital system according to claim 1, wherein the positional information acquiring means acquires the positional information of employees in the monitoring target area by authentication of authentication tags that the employees carry with them by a plurality of RFID readers installed in the monitoring target area, or the positional information from GPS function units that the mobile terminal devices comprise.

5. A smart-security digital method to prevent shoplifting of a habitual shoplifter or the like by monitoring videos shot by monitor cameras installed to shoot predetermined monitoring target areas in a store, wherein
a monitor device performs:
a positional information acquiring step of acquiring positional information of mobile terminal devices that a plurality of employees respectively carry with them in the store;
a facial image storing step of accumulating facial images of habitual shoplifters or suspicious behavior persons;
a face authentication collating step of collating a facial image of a person shot by the monitor camera with the facial images of habitual shoplifters or suspicious behavior persons accumulated in the facial image storing step;
a control step of determining, when a result of collation by the face authentication collating step is a match, a position of a first mobile terminal device closest to the habitual shoplifter or suspicious behavior person the collation result with whom is a match based on positional information acquired in the positional information acquiring step, and transmitting information on the habitual shoplifter or suspicious behavior person to said first mobile terminal device; and
an image processing step of synthesizing the videos shot by the monitor cameras on a display screen consisting of a plurality of split screens, and performing a zoom-in processing to zoom in one of the split screens, and
the first mobile terminal device performs:
a response-inability setting step of presetting being unable to answer back to the information on the habitual shoplifter or suspicious behavior person transmitted from the monitor device; and
a response inability answering step of returning, when response inability is set through the response-inability setting step and the first mobile terminal device receives the information on the habitual shoplifter or suspicious behavior person, an answer-back of said response inability to the monitor device, wherein
the control step is determining, when an answer-back of response inability is returned from the first mobile terminal device, a position of a second mobile terminal device next closest to the habitual shoplifter or suspicious behavior person the collation result with whom is a match, transmitting the information on the habitual shoplifter or suspicious behavior person to said second mobile terminal device, and on a display screen of said second mobile terminal device, zooming in a screen displaying one of the videos of the habitual shoplifter or suspicious behavior person shot by the monitor camera.

6. A tangible non-transitory computer-readable storage medium, the computer-readable storage medium is configured to store a program executable by a digital future-now security system, the digital future-now security system upon execution of the program is configured to perform the method of claim 5.

* * * * *